(12) United States Patent
Yamoto et al.

(10) Patent No.: US 10,210,966 B2
(45) Date of Patent: Feb. 19, 2019

(54) INSULATED WIRE AND COIL

(71) Applicants: FURUKAWA ELECTRIC CO., LTD., Tokyo (JP); FURUKAWA MAGNET WIRE CO., LTD., Tokyo (JP)

(72) Inventors: Satoko Yamoto, Tokyo (JP); Hideo Fukuda, Tokyo (JP); Makoto Oya, Tokyo (JP); Keisuke Ikeda, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 15/632,044

(22) Filed: Jun. 23, 2017

(65) Prior Publication Data
US 2017/0358382 A1     Dec. 14, 2017

Related U.S. Application Data

(63) Continuation of application No. PCT/JP2015/075972, filed on Sep. 14, 2015.

(30) Foreign Application Priority Data

Dec. 26, 2014   (JP) .................................. 2014-265390

(51) Int. Cl.
*H01B 1/02* (2006.01)
*H01B 3/30* (2006.01)
(Continued)

(52) U.S. Cl.
CPC ........... *H01B 3/427* (2013.01); *C09D 167/02* (2013.01); *C09D 171/00* (2013.01);
(Continued)

(58) Field of Classification Search
CPC ....... H01B 7/0009; H01F 27/324; H01F 5/06; H02K 3/04; H02K 3/30
See application file for complete search history.

(56) References Cited

U.S. PATENT DOCUMENTS 5,834,140 A * 11/1998 Wolski ..................... C25D 1/04
                                                        429/220
6,512,186 B1 * 1/2003 Nishiwaki .............. H05K 3/384
                                                        174/255
(Continued)

FOREIGN PATENT DOCUMENTS

EP     2133885 A1     12/2009
EP     3089168 A1     11/2016
(Continued)

OTHER PUBLICATIONS

International Search Report for PCT/JP2015/075972 (PCT/ISA/210) dated Nov. 2, 2015.
(Continued)

*Primary Examiner* — William H. Mayo, III
*Assistant Examiner* — Rhadames Alonzo Miller
(74) *Attorney, Agent, or Firm* — Birch, Stewart, Kolasch & Birch, LLP

(57) ABSTRACT

An insulated wire, containing: a rectangular conductor; and a thermoplastic resin layer on the rectangular conductor, wherein an adhesion strength between the thermoplastic resin layer and the rectangular conductor for a pair of sides of the rectangular conductor opposed to and an adhesion strength between the thermoplastic resin layer and the rectangular conductor for the other pair of sides of the rectangular conductor opposed to are different from each other.

5 Claims, 2 Drawing Sheets

(51) Int. Cl.
| | |
|---|---|
| H01B 3/42 | (2006.01) |
| H01B 7/00 | (2006.01) |
| H01B 7/02 | (2006.01) |
| H01F 5/06 | (2006.01) |
| H02K 3/04 | (2006.01) |
| H02K 3/30 | (2006.01) |
| H01F 27/28 | (2006.01) |
| H01F 27/32 | (2006.01) |
| C09D 167/02 | (2006.01) |
| C09D 171/00 | (2006.01) |
| C09D 179/02 | (2006.01) |
| C09D 181/02 | (2006.01) |

(52) U.S. Cl.
CPC ......... *C09D 179/02* (2013.01); *C09D 181/02* (2013.01); *H01B 1/026* (2013.01); *H01B 3/301* (2013.01); *H01B 3/306* (2013.01); *H01B 3/423* (2013.01); *H01B 7/00* (2013.01); *H01B 7/0009* (2013.01); *H01B 7/02* (2013.01); *H01F 5/06* (2013.01); *H01F 27/2823* (2013.01); *H01F 27/324* (2013.01); *H02K 3/04* (2013.01); *H02K 3/30* (2013.01)

(56) References Cited

U.S. PATENT DOCUMENTS

| | | | | | |
|---|---|---|---|---|---|
| 2004/0201013 | A1* | 10/2004 | Faris | ................ | B81C 1/00119 257/40 |
| 2007/0001319 | A1* | 1/2007 | Bauer | ................ | H01L 23/3142 257/783 |
| 2007/0040643 | A1* | 2/2007 | Inoue | ................ | H01F 17/045 336/213 |
| 2007/0065639 | A1* | 3/2007 | Iida | ................ | H05K 3/1266 428/141 |
| 2007/0128827 | A1* | 6/2007 | Faris | ................ | H01L 21/76254 438/455 |
| 2007/0135013 | A1* | 6/2007 | Faris | ................ | H01J 9/125 445/49 |
| 2009/0146280 | A1* | 6/2009 | Shimazaki | ................ | C25D 5/12 257/676 |
| 2010/0203231 | A1* | 8/2010 | Kusaka | ................ | H01B 3/301 427/9 |
| 2011/0155433 | A1* | 6/2011 | Funaya | ................ | H01L 23/49827 174/258 |
| 2013/0008685 | A1* | 1/2013 | Matsushita | ................ | H01B 3/46 174/110 R |
| 2013/0037304 | A1* | 2/2013 | Ikeda | ................ | H01B 3/306 174/119 C |
| 2013/0127038 | A1* | 5/2013 | Ko | ................ | C09J 7/10 257/734 |
| 2013/0240244 | A1* | 9/2013 | Honda | ................ | H01B 3/306 174/119 C |
| 2014/0020929 | A1* | 1/2014 | Hisada | ................ | H01B 7/0225 174/110 SR |
| 2014/0084713 | A1* | 3/2014 | Kurahara | ................ | H02K 3/30 310/45 |
| 2014/0216340 | A1* | 8/2014 | Kusaka | ................ | H01B 13/141 118/712 |
| 2015/0221412 | A1* | 8/2015 | Caudill | ................ | H01B 3/427 428/339 |
| 2015/0326086 | A1* | 11/2015 | Takahashi | ................ | H02K 3/12 310/45 |

FOREIGN PATENT DOCUMENTS

| | | |
|---|---|---|
| JP | 2013-20726 A | 1/2013 |
| JP | 2014-103045 A | 6/2014 |

OTHER PUBLICATIONS

Partial English translation of the Japanese Office Action issued in Patent Application No. 2014-265390 dated Mar. 31, 2015.
Concise English explanation for JP-2013-20726-A, published Jan. 31, 2013.
Japanese Office Action dated Mar. 31, 2015, for Japanese Application No. 2014-265390.
Extended European Search Report, dated Jul. 24, 2018, for European Application No. 15872372.6.

\* cited by examiner

INSULATED WIRE AND COIL

CROSS-REFERENCE TO RELATED APPLICATIONS

This application is a continuation of PCT/JP2015/075972 filed on Sep. 14, 2015 which claims benefit of Japanese Patent Application No. 2014-265390 filed on Dec. 26, 2014, the subject matters of which are incorporated herein by reference in their entirety.

TECHNICAL FIELD

The present invention relates to an insulated wire and a coil.

BACKGROUND ART

Advance of electrical equipment represented by motors or transformers has been progressed resulting in size reduction and improved performance during recent years. Thus, it becomes usual in many cases that insulated wires are used in such a way that the insulated wires are processed by winding (also referred to as coil processing) to winding wires and they are pushed into a quite small space to pack. Specifically, it is no exaggeration to say that the performance of a rotating electric machine, such as a motor, is determined by how many wound wires produced by coil processing the insulated wires into a coil shape can be held in a stator slot. As a result, improvement of the ratio of the sectional area of conductors to the sectional area of the stator slot (space factor) has been required to be particularly highly increased.

As a means of improving the space factor, a rectangular conductor whose cross-section is an approximate rectangular shape (hereinafter, referred to simply as "a rectangular conductor" or "a conductor") has been adopted. In a case of producing a small coil by using a rectangular conductor, in order to improve the space factor, the small coil is produced by an edge-wise-winding processing of an insulated wire having a small radius of curvature at a corner of the conductor, around a small diameter of a core. In such edge-wise coil, the load on the insulated wire is very large. For this reason, further advancement of mechanical characteristics of the insulated wire is required.

As a means of advancing the mechanical characteristics of the insulated wire, an attempt to improve an adhesion property between a conductor and an insulating coating has been made. For example, Patent Literature 1 discloses an insulated wire whose dynamic properties have been improved by forming an insulating coating on a previously heated conductor thereby to increase an adhesion property of the insulating coating to the conductor. Further, Patent Literature 2 discloses a covered rectangular wire in which an adhesion property between a coating material and a conductor has been improved by providing a viscoelastic body layer on a substrate surface.

CITATION LIST

Patent Literatures

Patent Literature 1: JP-A-2014-103045 ("JP-A" means unexamined published Japanese patent application.)
Patent Literature 2: JP-A-2013-20726

SUMMARY OF INVENTION

Technical Problem

However, in the prior arts described in the above Patent Literatures 1 and 2, an insulating coating layer is formed, whose adhesion strengths to a conductor have been equally improved with respect to two pairs of sides of a conductor opposed to. It was found that when an insulated wire having the foregoing insulating coating layer is coil processed, if a force exceeding a breaking elongation is put on the insulated wire by a phenomenon that the insulated wires rub hard against each other, fixation of the insulating coating layer with an equal adhesion strength with respect to all the sides of the conductor serves as a trigger of causing peel-off or cracks in the insulating coating layer.

The present invention is contemplated for providing an insulated wire in which an adhesion property of the insulating coating layer to the conductor is excellent and also peel-off and cracks in the insulating coating layer at the time of a coil processing are suppressed, and for providing a coil which employs the insulated wire.

Solution to Problem

As a result of intensive studies in order to solve the problems of the above-described prior arts, the present inventors have obtained such a knowledge that occurrence of peel-off or cracks in the insulating coating at the time of a coil processing of the insulated wire can be suppressed by employing a rectangular conductor, and by setting the adhesion strength between the insulating coating layer and the rectangular conductor for a pair of sides of the rectangular conductor opposed to and the adhesion strength between the insulating coating layer and the rectangular conductor for the other pair of sides of the rectangular conductor opposed to to a particular relationship. The present invention has been made based on this finding.

That is, the above-described problems of the present invention were solved by the following means.

(1) An insulated wire, comprising:
    a rectangular conductor; and
    a thermoplastic resin layer on the rectangular conductor, wherein an adhesion strength between the thermoplastic resin layer and the rectangular conductor for a pair of sides of the rectangular conductor opposed to and an adhesion strength between the thermoplastic resin layer and the rectangular conductor for the other pair of sides of the rectangular conductor opposed to are different from each other.

(2) An insulated wire according in the above item (1), wherein a difference of the adhesion strength between the thermoplastic resin layer and the rectangular conductor for a pair of sides of the rectangular conductor opposed to and the adhesion strength between the thermoplastic resin layer and the rectangular conductor for the other pair of sides of the rectangular conductor opposed to is 5 gf/mm to 100 gf/mm.

(3) An insulated wire described in the above item (1) or (2), wherein the difference of the adhesion strengths is 10 gf/mm to 50 gf/mm.

(4) An insulated wire described in any one of the above items (1) to (3), wherein a thermoplastic resin constituting the thermoplastic resin layer is at least one selected from the group consisting of polyether ether ketone, polyether ketone ketone, polyketone, polyphenylene sulfide, and thermoplastic polyimide.

(5) An insulated wire described in any one of the above items (1) to (4), wherein the rectangular conductor is composed of a material selected from a copper, an oxygen-free copper, and a copper alloy.

(6) A coil formed by winding processing the insulated wire described in any one of the above items (1) to (5).

In the description of the present invention, any numerical expressions in a style of " . . . to . . . " will be used to indicate a range including the lower and upper limits represented by the numerals given before and after "to", respectively.

Further, in the insulated wire of the present invention, the term "side" of the conductor means a portion of the side except for a corner portion of the conductor having a curvature radius as described below.

Further, in the insulated wire of the present invention, the term "corner portion of the conductor" means a curved portion of the conductor formed so as to have a predetermined curvature radius.

Further, in the insulated wire of the present invention, the term "rectangular conductor" means to include both an approximate rectangle-shaped conductor whose transverse cross-section has a curvature radius as described below at the corner portion thereof and an approximate cubic conductor whose transverse cross-section has a curvature radius as described below at the corner portion thereof.

Advantageous Effects of Invention

In the insulated wire of the present invention, an adhesion property of the insulating coating layer to a conductor is excellent and also peel-off and cracks in the insulating coating layer at the time of a coil processing are suppressed. Further, the coil of the present invention formed by a winding processing of the insulated wire of the present invention described above is prevented from the peel-off and cracks in the insulating coating layer due to bending at the time of the winding processing.

Other and further features and advantages of the invention will appear more fully from the following description, appropriately referring to the accompanying drawings.

MODE FOR CARRYING OUT THE INVENTION

<<Insulated Wire>>

The insulated wire of the present invention has a thermoplastic resin layer on a rectangular conductor whose four corner portions in the cross section each have a curvature radius r. The insulated wire of the present invention has a thermoplastic resin layer on a rectangular conductor, in which the adhesion strength between the thermoplastic resin layer and the rectangular conductor for a pair of sides of the rectangular conductor opposed to and the adhesion strength between the thermoplastic resin layer and the rectangular conductor for the other pair of sides of the rectangular conductor opposed to are different from each other.

Note that, with respect to a corner portion of the rectangular conductor, an adhesion strength between a thermoplastic resin layer and the rectangular conductor may be the same as any one of the adhesion strength between the thermoplastic resin layer and the rectangular conductor for a pair of sides of the rectangular conductor opposed to and the adhesion strength between the thermoplastic resin layer and the rectangular conductor for the other pair of sides of the rectangular conductor opposed to, and is preferably the same as either smaller adhesion strength of the two.

Figure 1:
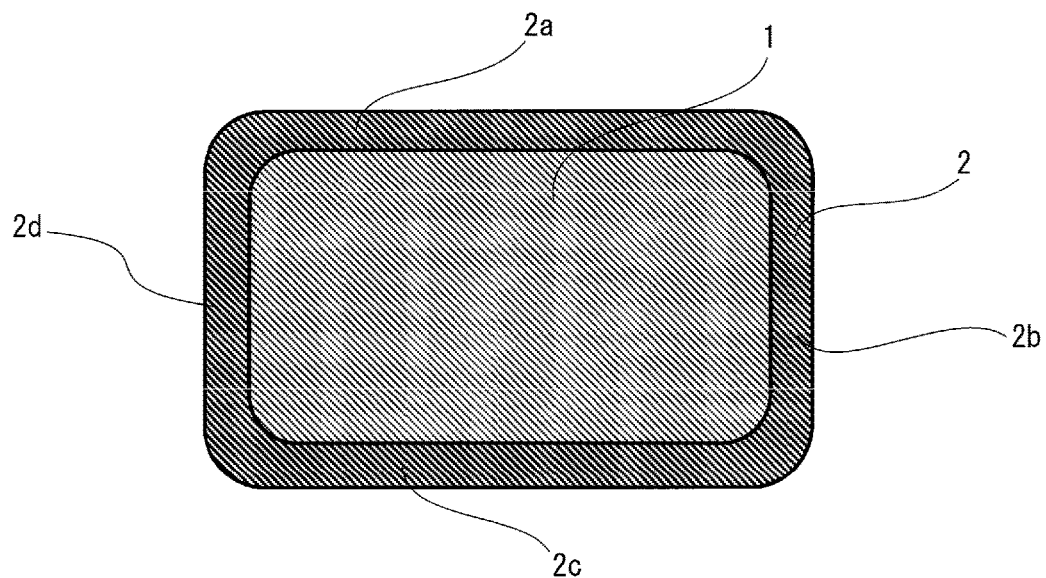
FIG. 1 is a schematic cross-sectional view showing an embodiment of the insulated wire of the present invention.

FIG. 1 shows a schematic cross-sectional view of the insulated wire having an approximate rectangle-shaped rectangular conductor as an embodiment of the present invention.

Hereinafter, in a case where the conductor has an approximate rectangle-shape, among two pairs of a pair of sides opposed to, a longer one may be called as a long side, while a shorter one may be called as a short side.

An embodiment of the insulated wire of the present invention is explained below with reference to FIG. 1. In FIG. 1, the adhesion strength is lowered by a microscopic unevenness at the adhesion state of an interface between a short side of a rectangular conductor 1 and a thermoplastic resin layer 2, or the like. The adhesion strength between a rectangular conductor 1 and a thermoplastic resin layer 2 at a long side of the rectangular conductor 1 is larger than the adhesion strength between the rectangular conductor 1 and the thermoplastic resin layer 2 at a short side of the rectangular conductor 1. A preparation method of the insulated wire the adhesion strength of which has been controlled as mentioned above will be described below.

In FIG. 1, the adhesion strength of a right side portion 2b of the thermoplastic resin layer 2 and the adhesion strength of a left side portion 2d of the thermoplastic resin layer 2 may be the same or different from each other, but are preferably the same. Further, the adhesion strength of an upper portion 2a of the thermoplastic resin layer 2 and the adhesion strength of an under portion 2c of the thermoplastic resin layer 2 may be the same or different from each other, but are preferably the same.

In a case where the adhesion strength of a right side portion 2b of the thermoplastic resin layer 2 and the adhesion strength of a left side portion 2d of the thermoplastic resin layer 2 are different from each other, and/or the adhesion strength of an upper portion 2a of the thermoplastic resin layer 2 and the adhesion strength of an under portion 2c of the thermoplastic resin layer 2 are different from each other, the expression "adhesion strength between the thermoplastic resin layer and the rectangular conductor for a pair of sides opposed to" means an average of the adhesion strengths at two sides opposed to.

Figure 2:
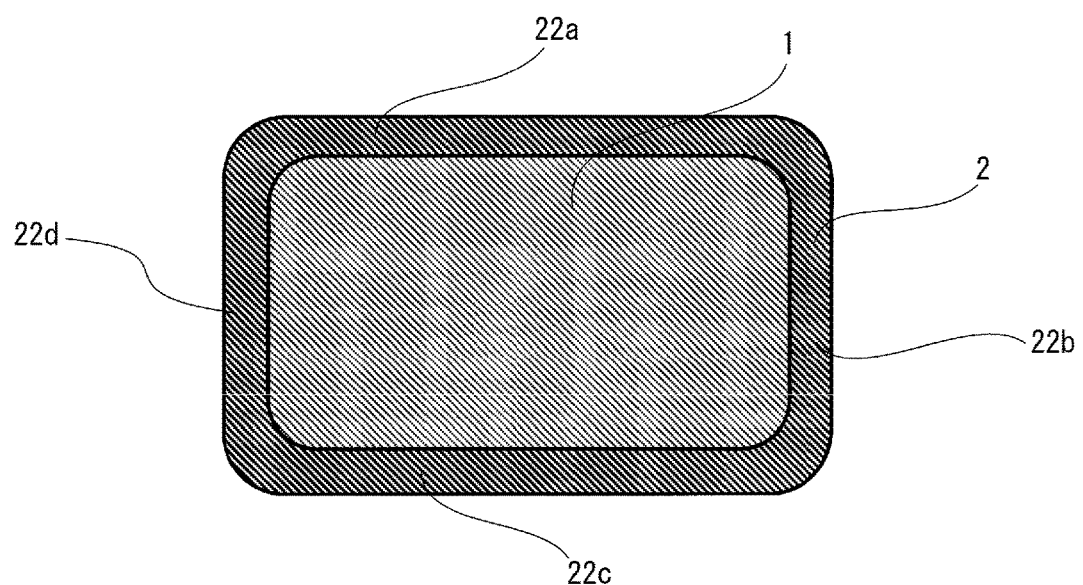
FIG. 2 is a schematic cross-sectional view showing the other embodiment of the insulated wire of the present invention.

FIG. 2 shows a schematic cross-sectional view of the insulated wire having an approximate rectangle-shaped rectangular conductor as an embodiment of the present invention different from FIG. 1.

An embodiment of the insulated wire of the present invention is explained below with reference to FIG. 2. The adhesion strength between a rectangular conductor 1 and a thermoplastic resin layer 2 at a long side of the rectangular conductor 1 is set to be smaller than the adhesion strength between the rectangular conductor 1 and the thermoplastic resin layer 2 at a short side of the rectangular conductor 1. The embodiment of the insulated wire of the present invention with reference to FIG. 2 is the same as that of FIG. 1 other than the magnitude correlation of the adhesion strengths described above.

Hereinafter, the insulated wire of the present invention is explained in sequence from a conductor.

<Conductor>

As the conductor used in the present invention, use may be made of any conductor that is usually used in insulated wires. The foregoing conductor is composed of an electrically conductive metal, and its material is not restricted in particular, as long as it is an electrically conductive substance. Examples thereof include aluminum or aluminum alloys, or copper or copper alloys. In a case where the rectangular conductor is composed of aluminum alloys, examples thereof include 1000-series aluminum alloys which have a low strength but a high aluminum ratio, and Al—Mg—Si-series alloys, for example, 6101 alloy of 6000-series aluminum alloys. As for the aluminum or aluminum alloys, its electric conductivity is about ⅔ of the copper or copper alloys. However, its gravity is about ⅓ of the copper or copper alloys. Accordingly, reduction in weight of the coil can be achieved, which allows a contribution to lightening of vehicle and improvement in fuel economy. In a case where a rectangular conductor is composed of copper or copper ally, use may be made of any conductor that is usually used in insulated wires. The conductor used in the present invention is preferably a copper wire and more preferably a low-oxygen copper whose oxygen content is 30 ppm or less, and furthermore preferably a low-oxygen copper whose oxygen content is 20 ppm or less or oxygen-free copper. In a case where the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

A conductor used in the present invention is a conductor whose cross-sectional shape is rectangular. The rectangular conductor has a higher space factor with respect to the stator slot at the time of winding, compared to a round conductor. Accordingly, the rectangular conductor is preferably used for this purpose.

In view of suppressing a partial discharge from a corner portion, the rectangular conductor has preferably such a shape that chamfered edges (curvature radius r) are provided at four corners as shown in FIGS. 1 and 2. The curvature radius r is preferably 0.6 mm or less and more preferably in a range from 0.2 to 0.4 mm.

The size of the conductor is not particularly limited, but the length of a pair of sides opposed to is preferably from 1 to 5 mm, and more preferably from 1.4 to 4.0 mm. On the other hand, the length of the other pair of sides opposed to is preferably from 0.4 to 3.0 mm, and more preferably from 0.5 to 2.5 mm. The ratio of length of a pair of sides opposed to to the length of the other pair of sides opposed to is preferably from 1:1 to 4:1.

<Thermoplastic Resin Layer>

The insulated wire of the present invention has at least one thermoplastic resin layer composed of a thermoplastic resin on a rectangular conductor.

Examples of the thermoplastic resin which can be used for the thermoplastic resin layer in the insulated wire of the present invention include: commodity engineering plastics such as polyamide (PA) (nylon), polyacetal (POM), polycarbonate (PC), polyphenylene ether (including a modified polyphenylene ether), polybutylene terephthalate (PBT), polyethylene terephthalate (PET), polyethylene naphthalate (PEN), and ultrahigh molecular weight polyethylene; and in addition, super engineering plastics such as polysulfone (PSF), polyether sulfone (PES), polyphenylene sulfide (PPS), polyarylate (U polymer), polyether ketone (PEK), polyarylether ketone (PAEK), tetrafluoroethylene/ethylene copolymer (ETFE), polyether ether ketone (PEEK), tetrafluoroethylene/perfluoalkylvinylether copolymer (PFA), polytetrafluoroethylene (PTFE), a thermoplastic polyimide resin (TPI), polyamideimide (PAI), and a liquid crystal polyester; and further a polymer alloy composed of polyethylene terephthalate (PET) or polyethylene naphthalate (PEN) as a base resin, ABS/polycarbonate, NYLON 6,6, aromatic polyamide resin, polymer alloys containing the foregoing engineering plastics such as polyphenylene ether/NYLON 6,6, polyphenylene ether/polystyrene, and polybutylene terephthalate/polycarbonate. In the present invention, from the viewpoints of heat resistance and stress crack resistance, polyphenylene sulfide (PPS), polyether ketone (PEKK), polyether ketone ketone (PEKK), polyarylether ketone (PAEK) (including modified PEEK), and polyether ether ketone (PEEK) may be preferably used in particular. These thermoplastic resins may be used singly or in combination thereof. Further, it is needless to say that the resin to be used is not limited by the above-described resin names, and resins other than those recited above also can be used, as long as they are superior in performance to those resins.

Among them, crystalline thermoplastic resin preferably includes, for example, polyamide (PA), polyacetal (POM), polybutylene terephthalate (PBT), polyphenylene sulfide (PPS), commodity engineering plastic such as polyethylene having an ultrahigh molecular weight, and polyether ether ketone (PEEK), polyether ketone (PEK), polyarylether ketone (PAEK) (including modified PEEK), polyether ketone ketone (PEKK), and a thermoplastic polyimide resin (TPI).

Examples of the thermoplastic resin which can be used for the thermoplastic resin layer in the insulated wire of the present invention include: commercially available products such as PEEK450G (trade name) manufactured by Victrex Japan Inc. as the PEEK; AVASPIRE AV-650 (trade name) manufactured by Solvay Co. or AV-651 (trade name) as the modified PEEK; AURUM PL 450C (trade name) manufactured by Mitsui Chemicals, Inc. as the TPI; DURAFIDE 0220A9 (trade name) manufactured by Polyplastics Co., Ltd., or PPS FZ-2100 (trade name) manufactured by DIC Corporation as the PPS; XAREC S105 (trade name) manufactured by Idemitsu Kosan Co., Ltd. as the SPS; and NYLON 6,6 (manufactured by UNITIKA LTD.: FDK-1 (trade name)), NYLON 4,6 (manufactured by UNITIKA LTD.: F-5000 (trade name)), NYLON 6,T (manufactured by Mitsui Chemicals, Inc.: ARLENE AE-420 (trade name)), and NYLON 9,T (manufactured by KURARAY CO., LTD.: GENESTOR N-1006D (trade name)) as the PA; SUMIKA EXCEL 3600G (trade name) manufactured by Sumitomo Chemical Co., Ltd. as the PES; ULTEM 1000 (trade name) manufactured by Saudi Basic Industries Corporation as the PEI; and TR-8550T1 (trade name) manufactured by Teijin Limited as the PET.

Among them, from the standpoint of thermal aging resistance and solvent resistance, a resin used for a thermoplastic resin layer is preferably a crystalline thermoplastic resin, and among the crystalline thermoplastic resins, PEEK, PPS, and TPI are particularly preferable.

In the present specification, the term "crystalline" means a property of capable of having a regularly arranged crystalline structure in at least a part of the polymer chain, under an environment convenient for crystallization. On the contrary, the term "non-crystalline" means to maintain an amorphous condition which has almost no crystalline structure and means such a property that the polymer chain becomes a random condition in curing.

Regarding these thermoplastic resins used herein, only one kind thereof may be used alone, or two more kinds thereof may be used by mixture. Moreover, in the case where the thermoplastic resin layer is formed of a plurality of layers, a thermoplastic resin different from each other in each layer may be used, and a thermoplastic resin whose mixing ratio is different from each other in each layer may be used.

In the case where two kinds of thermoplastic resin are used in mixture, for example, both resins can be used by subjecting them to polymer alloy thereby making a compatible type uniform mixture, or can be used by forming a non-compatible blend into a compatible state with a compatibilizing agent.

In the present invention, the thickness of the thermoplastic resin layer is preferably 10 to 100 μm, more preferably 20 to 50 μm.

If the thermoplastic resin layer is too thick, the thermoplastic resin layer may not be peeled even the adhesion strength thereof is the same. Therefore, an advantageous effect is expected in the thickness of 100 μm or less in particular. Further, if the thermoplastic resin layer is too thin, a dielectric breakdown voltage thereof is so low that such thin thermoplastic resin layer is not fitted for a coil-use insulated wire.

In the present invention, various additives such as a crystallization nucleating agent, a crystallization accelerator, a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer may be incorporated into raw materials from which the thermoplastic resin layer is obtained, to the extent that the characteristics are not affected. Furthermore, a layer formed from a resin containing these additives may be laminated on the resulting insulated wire, or the insulated wire may be coated with a coating material containing these additives.

<Adhesion Strength>

As described above, the insulated wire of the present invention has a thermoplastic resin layer on a rectangular conductor, in which the adhesion strength between the thermoplastic resin layer and the rectangular conductor for a pair of sides of the rectangular conductor opposed to and the adhesion strength between the thermoplastic resin layer and the rectangular conductor for the other pair of sides of the rectangular conductor opposed to are different from each other. Hereinafter, the function effect of the present invention is explained with reference to FIG. 1.

In FIG. 1, as described above, the adhesion strength between a rectangular conductor 1 and a thermoplastic resin layer 2 at a long side of the rectangular conductor 1 is larger than the adhesion strength between the rectangular conductor 1 and the thermoplastic resin layer 2 at a short side of the rectangular conductor 1. In the foregoing insulated wire of the present invention, if a shear force is put on a right side portion 2b and a left side portion 2d of the thermoplastic resin layer 2 at a coil processing, these portions are misaligned by a phenomenon that a minute air gap of the degree of no effect on the performance of the insulated wire is occurred just below the insulating coating layer. For this reason, the insulated wire of the present invention shown in FIG. 1 is able to absorb deformation exceeding a breaking elongation of the thermoplastic resin layer 2, so that occurrence of peel-off and cracks in the insulating coating layer can be suppressed.

Herein, in the insulated wire of the present invention, if the "peel-off" occurs in place of the above-described "air gap", the performance of the insulated wire is lowered to the degree of unusable state in practice.

Note that, in the present invention, in a case where the rectangular conductor has an approximate rectangle-shape, the adhesion strength between a rectangular conductor and a thermoplastic resin layer at a long side of the rectangular conductor and the adhesion strength between the rectangular conductor and the thermoplastic resin layer at a short side of the rectangular conductor only have to be different from each other, so that which is larger does not make any difference.

In the present invention, a difference of an adhesion strength between a thermoplastic resin layer and a rectangular conductor for a pair of sides of a rectangular conductor opposed to and an adhesion strength between a thermoplastic resin layer and a rectangular conductor for the other pair of sides of a rectangular conductor opposed to is preferably 5 gf/mm to 100 gf/mm, more preferably 10 gf/mm to 50 gf/mm, particularly preferably 20 gf/mm to 40 gf/mm.

In the present invention, although the adhesion strength between a thermoplastic resin layer and a rectangular conductor for a pair of sides of a rectangular conductor opposed to is not particularly limited, the adhesion strength is preferably within the range from 5 gf/mm to 120 gf/mm, more preferably 5 gf/mm to 100 gf/mm. On the other hand, although an adhesion strength between a thermoplastic resin layer and a rectangular conductor for the other pair of sides of a rectangular conductor opposed to is not particularly limited, the adhesion strength is preferably within the range from 5 gf/mm to 120 gf/mm, more preferably 5 gf/mm to 100 gf/mm.

From the viewpoint of absorbing deformation exceeding a breaking elongation of the thermoplastic resin layer, a difference of the adhesion strength as well as the adhesion strength are preferably in the above-described ranges.

Note that, the method of measuring the adhesion strength is described below.

<<Method of Producing an Insulated Wire>>

A method of producing an insulated wire is not restricted in particular, as long as the adhesion strength can be achieved by the method so as to satisfy the prescription of the present invention. Examples thereof include production methods controlled by the following ways.

(1) Production Method of Using a Difference in Surface Roughness of the Conductor By laser or plasma irradiation, asperity is formed on the surface of a pair of sides of the rectangular conductor opposed to on the side to lessen the adhesion strength with a thermoplastic resin layer. By extrusion-coating of a thermoplastic resin after formation of the asperity, an insulated wire can be obtained in which the adhesion strength for a pair of sides of the rectangular conductor opposed to having formed thereon no asperity is larger than the adhesion strength for a pair of sides of the rectangular conductor opposed to having formed thereon asperity.

(2) Production Method of Using a Difference in Surface Temperature of the Conductor An insulated wire is produced by extrusion-coating a thermoplastic resin on a preliminarily heated rectangular conductor.

Heating of the rectangular conductor is performed by passing it through a tube provided with an electrically heated wire on the inside thereof. For example, in a case of using a tube whose transverse section is rectangular, a distance between a pair of sides of the rectangular conductor opposed to and the electrically heated wire and a distance between the other pair of sides of the rectangular conductor opposed to and the electrically heated wire are different from each other. By a difference between these distances, a surface temperature of a pair of sides of the rectangular conductor opposed to and a surface temperature of the other pair of sides of the rectangular conductor opposed to can be dissimilated. By extrusion-coating a thermoplastic resin on the rectangular conductor a surface temperature of which has been controlled as mentioned above, an insulated wire can be obtained in which the adhesion strength for a pair of sides of the rectangular conductor opposed to and the adhesion strength for the other pair of sides of the rectangular conductor opposed to are different from each other.

Due to the characteristics mentioned above, the insulated wire of the present invention is applicable to a field which requires resistance to voltage and heat resistance, such as various kinds of electric equipment (may be also called electronic equipment). For example, the insulated wire of the present invention is coil-processed and used for a motor, a transformer and the like, which can compose high-performance electric equipment. In particular, the insulated wire is preferably used as a winding for a driving motor of HV (Hybrid Vehicles) and EV (Electric Vehicles). As just described, the present invention can provide electric equipment, particularly a driving motor of HV and EV, by using the insulated wire through coil processing. Meanwhile, in the case where the insulated wire of the present invention is used for a motor coil, it is also called an insulated wire for the motor coil.

EXAMPLES

The present invention will be described in more detail based on examples given below, but the invention is not meant to be limited by these.

Example 1

An insulated wire shown in FIG. 2 was prepared.

As a conductor 1, a conductor rectangular having rectangular cross-section (long side 3.0 mm×short side 1.7 mm, curvature radius of chamfered edge at four corners r=0.3 mm) (copper having an oxygen content of 5 ppm) was used.

Using a tube having a rectangular transverse section and provided with an electrically heated wire on the inside thereof, the rectangular conductor was heated so that a surface temperature of a short side of the rectangular conductor was higher than a surface temperature of a long side of the rectangular conductor.

By extrusion-coating a thermoplastic resin of polyether ether ketone (PEEK) (trade name: PEEK381G, manufactured by Victrex Japan Co., Ltd.) on this rectangular conductor, an insulated wire composed of a PEEK-coated conductor was obtained in which the adhesion strength of a thermoplastic resin layer 2 with respect to the long side of the rectangular conductor was lesser than the adhesion strength of the thermoplastic resin layer 2 with respect to the short side of the rectangular conductor.

The thickness of PEEK coat layer was 0.03 mm. Further, the adhesion strength of each of the right side portion 22b and the left side portion 22d of the thermoplastic resin layer 2 with respect to the short side of the rectangular conductor was the same value. Further, the adhesion strength of each of the upper portion 22a and the under portion 22c of the thermoplastic resin layer 2 with respect to the long side of the rectangular conductor was also the same value. Further, the adhesion strength of the thermoplastic resin layer 2 with respect to the corner portion of the rectangular conductor was the same as the adhesion strength of the upper portion 22a of the thermoplastic resin layer 2 with respect to the long side of the rectangular conductor.

Note that, the method of measuring the adhesion strength is described below.

Examples 2 to 19 and Comparative Examples 1

As a conductor 1, a conductor rectangular having rectangular cross-section (long side 3.0 mm×short side 1.7 mm, curvature radius of chamfered edge at four corners r=0.3 mm) (copper having an oxygen content of 5 ppm) was used. Insulated wires composed of a thermoplastic resin-coated conductor as shown in FIG. 1 or FIG. 2 were obtained in the same manner as in Example 1, except that a thermoplastic resin layer, the adhesion strength between the thermoplastic resin layer and the rectangular conductor with respect to the long side of the rectangular conductor, the adhesion strength between the thermoplastic resin layer and the rectangular conductor with respect to the short side of the rectangular conductor were changed as shown in the following Table 1.

Note that, in the insulated wires shown in FIG. 1, the adhesion strength of each of the right side portion 2b and the left side portion 2d of the thermoplastic resin layer 2 with respect to the short side of the rectangular conductor was the same value. Further, the adhesion strength of each of the upper portion 2a and the under portion 2c of the thermoplastic resin layer 2 with respect to the long side of the rectangular conductor was also the same value. Further, the adhesion strength of the thermoplastic resin layer 2 with respect to the corner portion of the rectangular conductor was the same as the adhesion strength of the right side portion 2b of the thermoplastic resin layer 2 with respect to the short side of the rectangular conductor.

On the other hand, in the insulated wire shown in FIG. 2, the adhesion strength of each of the right side portion 22b and the left side portion 22d of the thermoplastic resin layer 2 with respect to the short side of the rectangular conductor was the same value. Further, the adhesion strength of each of the upper portion 22a and the under portion 22c of the thermoplastic resin layer 2 with respect to the long side of the rectangular conductor was also the same value. Further, the adhesion strength of the thermoplastic resin layer 2 with respect to the corner portion of the rectangular conductor was the same as the adhesion strength of the upper portion 22a of the thermoplastic resin layer 2 with respect to the long side of the rectangular conductor.

(Method of Measuring Adhesion Strength)

An insulated wire having partially peeled thermoplastic resin layer was set on a tension tester (instrument name "AUTOGRAPH AG-X", manufactured by Shimadzu Corporation), and the thermoplastic resin layer was peeled upward at a rate of 4 mm/min (180° peeling-off). A tensile load measured at the time was defined as an adhesion strength (gf/mm).

Each of the thus-prepared insulated wires was subjected to wire pulling test.

Wire Pulling Test (Evaluation of Peel-Off and Crack)

Figure 3A:
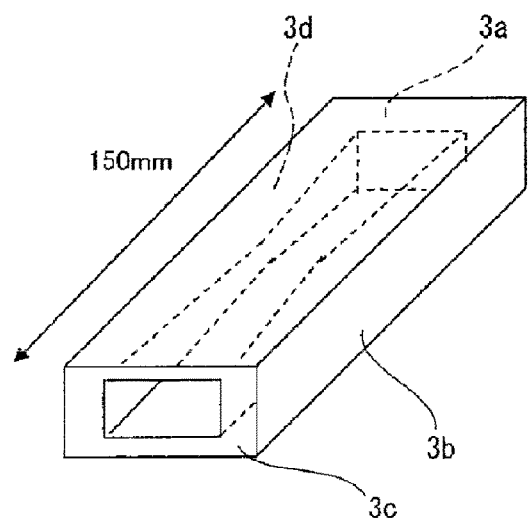
FIG. 3(a) is a schematic view showing a jig used for a wire pulling test in Examples.
Figure 3B:
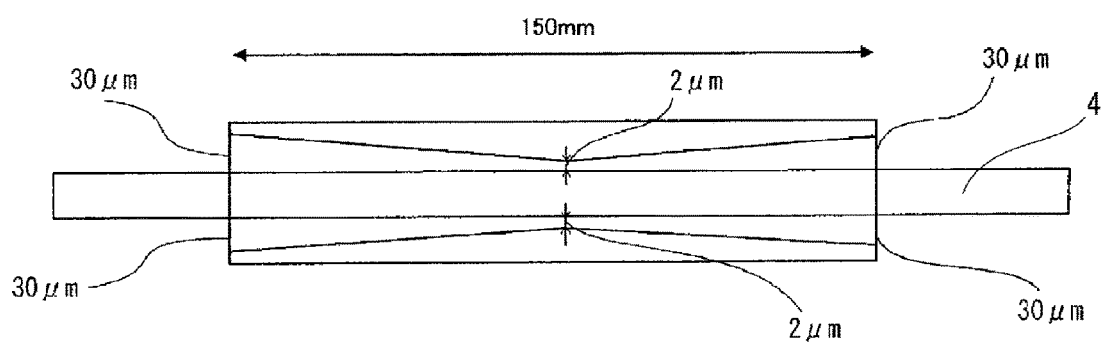
FIG. 3(b) is a schematic vertical cross-sectional view showing a jig at a state in which a wire sample prepared in Examples has been put through the jig.

Each of the insulated wires was put through a jig having a hole at the inside thereof as shown in FIGS. 3(a) and 3(b), and was pulled out with an edge thereof. Then, each of the insulated wires after pulling was visually confirmed to determine whether or not peeling-off or cracks (breaking) of the coating occurred in the insulating layer. A specific test method is described below.

A 400 mm-long wire sample cut from the insulated wire produced in each of Examples and Comparative Examples was put from the 3a side of the jig having a hole at the inside thereof as shown in FIG. 3(a). Then, at the state where one edge of the wire sample was exited at the length of 150 mm from the 3c side of the jig, the wire sample was set on the tension tester (instrument name "AUTOGRAPH AG-X", manufactured by Shimadzu Corporation) together with the jig so that the 3c side of the jig was placed at the bottom. The edge at the 3c side of the wire sample exiting from the 3c side of the jig was pulled parallel to the 3b at the rate of 100 mm/min in the direction of from the 3a to the 3c, so that the wire sample was brought into contact (rub) with the jig to observe whether or not peeling-off or cracks occurred in the insulating coating layer. Next, placing the 3a at the bottom, the edge at the 3a side of the wire sample at the state of exiting at the length of 150 mm from the 3a side of the jig was pulled in the same manner as the above, so that the wire sample was brought into contact with the jig to observe whether or not peeling-off or cracks occurred in the insulating coating layer.

Further, the wire sample was put from the 3a side of the jig. Then, at the state where one edge of the wire sample was exited at the length of 150 mm from the 3c side of the jig, the wire sample was set on the tension tester (instrument name "AUTOGRAPH AG-X", manufactured by Shimadzu Corporation) together with the jig so that the 3d side of the jig was placed at the bottom. The edge at the 3c side of the wire sample exiting from the 3c side of the jig was pulled parallel to the 3b at the rate of 100 mm/min in the direction of from the 3a to the 3c, so that the wire sample was brought into contact with the jig to observe whether or not peeling-off or cracks occurred in the insulating coating layer. Next, placing the 3b at the bottom, the edge at the 3a side of the wire sample at the state of exiting at the length of 150 mm from the 3a side of the jig was pulled in the same manner as the above, and thereby the wire sample was brought into contact with the jig to observe whether or not peeling-off or cracks occurred in the insulating coating layer.

Provided that the processes so far are one pulling test, this pulling test of each wire sample was repeatedly conducted 4 times.

A case where the pulling test was conducted 4 times and either peeling-off or cracks could not at all be confirmed was evaluated as "A", a case where the pulling test was conducted 3 times and either peeling-off or cracks could not at all be confirmed was evaluated as "B", a case where the pulling test was conducted 2 times and either peeling-off or cracks could not at all be confirmed was evaluated as "C", a case where the pulling test was conducted 1 time and either peeling-off or cracks could not at all be confirmed was evaluated as "D", a case where either peeling-off or cracks could be confirmed by conducting once the pulling test was evaluated as "E".

The criteria "A", "B" and "C" are acceptable and the criteria "D" and "E" are not acceptable.

The obtained results are shown in Tables 1 to 3 below.

TABLE 1

| | | Ex 1 | Ex 2 | Ex 3 | Ex 4 | Ex 5 | Ex 6 | Ex 7 | Ex 8 |
|---|---|---|---|---|---|---|---|---|---|
| | Thermoplastic resin layer | PEEK | PEEK | PEEK | PEEK | PPS | PPS | PPS | TPI |
| | Thickness of thermoplastic resin layer | 0.03 | 0.02 | 0.03 | 0.04 | 0.03 | 0.03 | 0.05 | 0.03 |
| | Adhesion strength at long side | 40 | 30 | 30 | 30 | 30 | 20 | 20 | 30 |
| | Adhesion strength at short side | 70 | 80 | 40 | 35 | 40 | 120 | 70 | 40 |
| | Difference of adhesion strengths | 30 | 50 | 10 | 5 | 10 | 100 | 50 | 10 |
| | Melting point (° C.) | 343 | 343 | 343 | 280 | 280 | 280 | 280 | 388 |
| Evaluation item | Wire pulling test | A | B | A | C | A | C | B | A |

| | | Ex 9 | Ex 10 | Ex 11 | Ex 12 | Ex 13 | Ex 14 | Ex 15 | Ex 16 |
|---|---|---|---|---|---|---|---|---|---|
| Constitution of insulating layer | Thermoplastic resin layer | TPI | PEEK | PEEK | PEEK | PEEK | PPS | PPS | PPS |
| | Thickness of thermoplastic resin layer | 0.04 | 0.03 | 0.02 | 0.03 | 0.04 | 0.03 | 0.03 | 0.05 |
| | Adhesion strength at long side | 30 | 70 | 80 | 40 | 35 | 40 | 120 | 70 |
| | Adhesion strength at short side | 80 | 40 | 30 | 30 | 30 | 30 | 20 | 20 |
| | Difference of adhesion strengths | 50 | 30 | 50 | 10 | 5 | 10 | 100 | 50 |
| | Melting point (° C.) | 388 | 343 | 343 | 343 | 343 | 280 | 280 | 280 |
| Evaluation item | Wire pulling test | B | A | B | A | C | A | C | B |

| | | Ex 17 | Ex 18 | Ex 19 | Ex 20 | Ex 21 | Ex 22 | CEx 1 |
|---|---|---|---|---|---|---|---|---|
| Constitution of insulating layer | Thermoplastic resin layer | TPI | TPI | PEEK | PES | PEI | PET | PEEK |
| | Thickness of thermoplastic resin layer | 0.03 | 0.04 | 0.03 | 0.02 | 0.1 | 0.03 | 0.05 |
| | Adhesion strength at long side | 40 | 80 | 20 | 30 | 40 | 20 | 80 |
| | Adhesion strength at short side | 30 | 30 | 100 | 70 | 30 | 100 | 80 |
| | Difference of adhesion strengths | 10 | 50 | 80 | 40 | 10 | 80 | 0 |
| | Melting point (° C.) | 388 | 388 | 343 | — | — | 260 | 343 |
| Evaluation item | Wire pulling test | A | B | C | B | B | C | E |

Notes)
Unit for "Adhesion strength at long side", "Adhesion strength at short side", and "Difference of adhesion strengths" is gf/mm. Further unit for "Thickness of thermoplastic resin layer" is mm.
"Ex" means "Example", while "CEx" means "Comparative Example".
PEEK: PEEK381G manufactured by Victrex Japan Co., Ltd. (trade name)
PPS: DURAFIDE 0220A9 manufactured by Polyplastics Co., Ltd. (trade name)
TPI: AURUM PL 450C manufactured by Mitsui Chemicals, Inc. (trade name)
PES: SUMIKA EXCEL 3600G manufactured by Sumitomo Chemical Co., Ltd. (trade name)
PEI: ULTEM 1000 manufactured by Saudi Basic Industries Corporation (trade name)
PET: TR-8550T1 manufactured by Teijin Limited (trade name)

In the insulated wires of Examples 1 to 22 in which the adhesion strength between a thermoplastic resin layer and a rectangular conductor for a pair of sides of the rectangular conductor opposed to and the adhesion strength between a thermoplastic resin layer and a rectangular conductor for the other pair of sides of the rectangular conductor opposed to were different from each other, all of them achieved an acceptable level in the wire pulling test. In contrast, in Comparative Example 1 in which the adhesion strength between a thermoplastic resin layer and a rectangular conductor for a pair of sides of the rectangular conductor opposed to and the adhesion strength between a thermoplastic resin layer and a rectangular conductor for the other pair of sides of the rectangular conductor opposed to were not different from each other, the insulated wire was rejected in the wire pulling test.

Further, it is found that, among Examples 1 to 22, Examples 1~3, 5, 7 to 12, 14, 16 to 18, 20 and 21 satisfy the mechanical property (the results of the wire pulling test) at a higher standard.

Further, the insulated wires of Examples 1 to 22 were subjected to the following two tests.

Bending Test After Xylene Immersion (Evaluation of Solvent Resistance)

In the bending test after xylene immersion, evaluation was performed as follows. 1% elongated linear insulated wires were each immersed in a xylene solution for 10 seconds. After immersion, the insulated wires were taken out and were subjected to an 180°-bending test on the iron core with a radius of 2 mm as an axis. A case where either peeling-off or cracks could not at all be confirmed in the insulating layer was evaluated as pass, whereas a case where either peeling-off or cracks occurred and occurrence thereof could be visually confirmed was evaluated as rejection.

Evaluation of Thermal Aging Resistance

With reference to "3. Thermal shock resistance (applied to enameled wires and tape winding wires)" in JIS C 3216-6 "Winding wires-Test method-Part 1: General)," 1% elongated linear insulated wires were each left to stand in a thermostat bath at 200° C. for 500 hours, and then whether or not cracks occurred in the insulating layer was visually confirmed. A case where the cracks could not be confirmed was evaluated as pass, whereas a case where the cracks could be confirmed was evaluated as rejection.

In the above test results, the insulated wires of Examples 1 to 19 achieved an acceptable level in the wire pulling test and also were excellent in terms of solvent resistance and thermal aging resistance, as described above. Further, the insulated wires of Examples 20 to 22 were inferior in either result of the solvent resistance or the thermal aging resistance, but the result in the wire pulling test thereof was an acceptable level.

From the above results, it is found that the insulated wire of the present invention can be preferably used for electrical/electronic equipment such as a coil, especially a motor coil.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Conductor
2 Thermoplastic resin layer
2a, 22a Portions of thermoplastic resin layer which contact the upper portion of a rectangular conductor (upper portion)
2b, 22b Portions of thermoplastic resin layer which contact the right side portion of a rectangular conductor (right side portion)
2c, 22c Portions of thermoplastic resin layer which contact the under portion of a rectangular conductor (under portion)
2d, 22d Portions of thermoplastic resin layer which contact the left side portion of a rectangular conductor (left side portion)
3a to 3d Each side of jig
4 Insulated wire specimen

The invention claimed is:

1. An insulated wire, comprising:
a rectangular conductor; and
a thermoplastic resin layer on the rectangular conductor,
wherein an adhesion strength between the thermoplastic resin layer and the rectangular conductor for a pair of sides of the rectangular conductor opposed to and an adhesion strength between the thermoplastic resin layer and the rectangular conductor for the other pair of sides of the rectangular conductor opposed to are different from each other,
wherein a difference of the adhesion strength between the thermoplastic resin layer and the rectangular conductor for a pair of sides of the rectangular conductor opposed to and the adhesion strength between the thermoplastic resin layer and the rectangular conductor for the other pair of sides of the rectangular conductor opposed to is 5 gf/mm to 100 gf/mm.

2. An insulated wire according to claim 1, wherein the difference of the adhesion strengths is 10 gf/mm to 50 gf/mm.

3. An insulated wire according to claim 1, wherein a thermoplastic resin constituting the thermoplastic resin layer is at least one selected from the group consisting of polyether ether ketone, polyether ketone ketone, polyketone, polyphenylene sulfide, and thermoplastic polyimide.

4. An insulated wire according to claim 1, wherein the rectangular conductor is composed of a material selected from a copper, an oxygen-free copper, and a copper alloy.

5. A coil formed by winding processing the insulated wire according to claim 1.

* * * * *